Nov. 13, 1956

F. SEDLACEK 2,770,473

METER READING CARD CONTAINER

Filed Jan. 16, 1956

INVENTOR

Frank Sedlacek

BY Shreve, Crowe & Gordon

ATTORNEYS

United States Patent Office 2,770,473

Patented Nov. 13, 1956

2,770,473

METER READING CARD CONTAINER

Frank Sedlacek, Cary, Ill.

Application January 16, 1956, Serial No. 559,234

5 Claims. (Cl. 281—44)

Generically this invention relates to a card carrying container, but it more particularly is directed to a card container case adapted to contain cards bearing meter identifying and meter recording indicia, and so constructed as to facilitate the reading and handling of the cards upon elevation of the container top, the top also constituting a handle for carrying the container.

In connection with every electric, gas, and water installation, it is the general practice to periodically record on a card the reading of each meter of each respective installation for a particular section, block, or meter location, the card bearing the name and address of the customer, the meter number, etc., whereby billing of the customer may be effected.

In order to facilitate the reading of the meters, each meter reader is provided with a container or case for carrying a stack of, in the present instance, rectangular tabulating cards for meter reading purposes which he arranges in the order of the meters to be read.

In the meter reading card containers of the type heretofore in use, each meter reading card of the stack of cards bears at the top left hand corner thereof, meter identifying indicia, giving the name and address of the customer of the meter so assigned, and, also there are tabulating spaces for entering on the card the meter reading data for recording purposes. The container structure includes means tending to hold the cards in the container when the top is in open position, but partially concealing said meter identifying indicia on the topmost card, thereby rendering it frequently necessary to substantially remove the card to ascertain the complete identity and location of the customer. Therefore, one of the principal objects of this invention, is the provision of improved means tending to hold the cards in the container against wind-lifting during the meter reading and recording operation, and at the same time constructed and arranged to permit a clear vision of the meter identifying indicia on the topmost card of the stack, upon elevating or opening of the container top or cover.

Heretofore, a container cover hinge structure has been secured to the rear wall of the container with a substantially wide card holding means overlying the rear end of the card stack flush with the upper edge of the container and which partially concealed the customer identifying indicia from view and rendered more difficult the insertion of the stack into the container. Therefore, an important object of this invention is the provision of a stack engaging means operatively associated with the rear end wall, and including laterally spaced guard fingers and an intermediate element extending between the fingers and adapted to extend over the upper edge of the end wall and engage the upper end of the stack below the upper edges of the container, the fingers extending upwardly within the container and with said intermediate element constituting stack and card hold-down means, the guard fingers of which element tend to direct the end of the stack into compressed position with respect to said intermediate member as the stack is placed in the container, and said fingers are also adapted to protect the cards against wind-lifting.

In connection with the card carrying container or case of the instant invention, it will be noted that the cards of the stack of tabulating cards are arranged in the container or case in a predetermined order, so that when each meter as identified by the uppermost card has been read and the data entered thereon, said card, in order to retain its proper sequence, in the processed cards must be removed and placed at the bottom of the stack without the stack being removed from the container. Heretofore, in the construction and arrangement of the container and end wall construction, resilient means on the container bottom and associated with the end wall for maintaining the end of the stack spaced from the bottom of the container to effect insertion of the removed card has proven deficient and unsatisfactory in practice, and by reason of the integral end wall, removal and replacement of the stack in the container has proven difficult. Therefore, other important objects of this invention are: The elimination of the separate resilient means by the provision of upstanding spaced bosses projecting upwardly from the bottom of the container to permit easy insertion of the removed card beneath the stack, and the provision of a centrally disposed opening extending throughout the height of the end wall, whereby the ready removal of the stack may be expeditiously effected by simply gripping the end of the stack between the thumb and finger and lifting it out of the container.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures of which:

Figure 1:
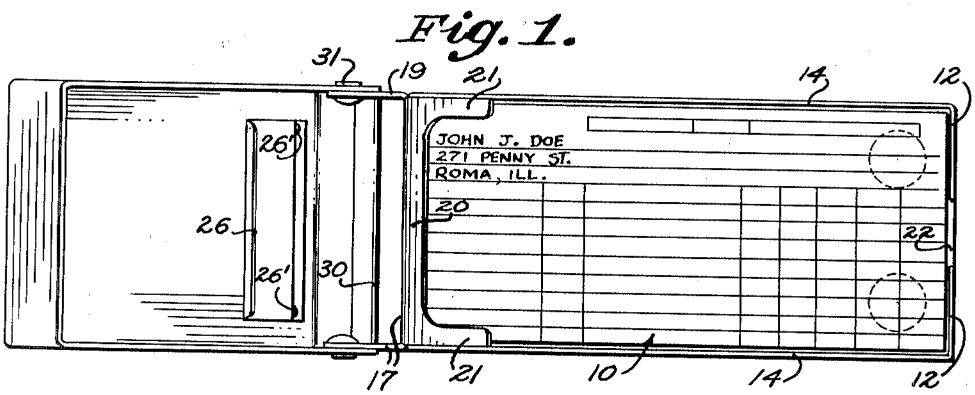
Fig. 1 is a plan view of my improved card container for meter readers with the top or cover in open position.
Figure 2:
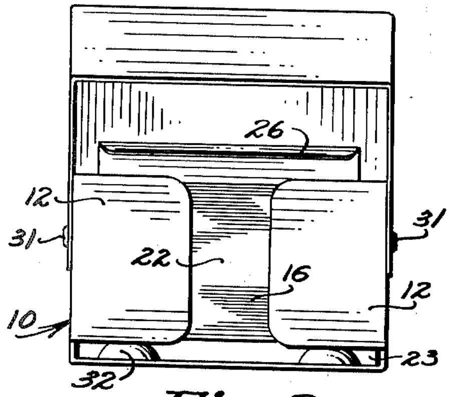
Fig. 2 is an end elevation with the lid or cover open.
Figure 3:
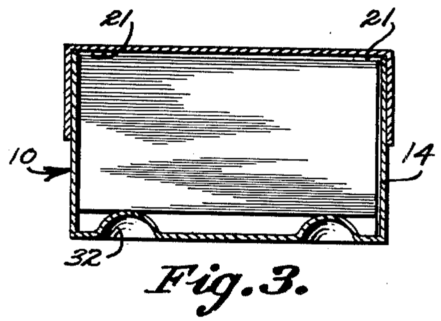
Fig. 3 is a cross section with cover closed.

In the illustrated embodiment characterizing this invention there is shown a card container or case for meter readers generally designated by the reference numeral or character 10. The case 10 may be constructed from a light material such as aluminum, plastic or other suitable material, and comprises a bottom 11, front wall 12, rear wall 13 and side walls 14 of uniform height corresponding to that of the front wall 12, except that the rear wall 13 terminates at its upper edge spaced downwardly from the upper edges of the side walls as at 15, for a purpose directly more fully appearing.

The container or case 10 is, in the present instance, rectangular and box-like in configuration and placed therein and carried thereby is a stack of tabulating cards 16. These cards are of similar shape and fit within the case. Also they are conventional business machine tabulating cards designed for use by a meter reader for entering the meter reading thereon for purposes of record, and such other data as may be necessary.

As above stated, the rear wall 13 of the container 10 is of less height than the front wall 12, and mounted exteriorly on said rear wall is a hinge and stack hold down structure 17 comprising a plate member 18 formed at its ends with rearwardly extending parallel hinge ears 19, said plate member 18 is secured to the rear wall 13 by rivets (not shown) or other suitable attaching means. The plate member 18 is formed with an intermediate narrow portion or lip member 20 projecting over the end wall 13 and slightly upwardly in compressing engagement with the upper end of the stack of cards 16, and continuing from said plate upwardly adjacent to the side walls 14 are the integral guard fingers 21 terminating slightly short of the upper edges of the side walls 14. It will thus be seen, that when the stack of cards 16 is placed in the container 10 the ends of the cards will be directed downwardly by the fingers 21 and into compressed relation under the plate or lip portion 20 (Fig. 4), tending to separate the forward ends of the cards and rendering it easy to remove the uppermost card. Also, this formation, and arrangement of the fingers with respect to the member 20 provides a clear vision of the identifying name and address of the customer to whom the meter carried by the uppermost card is assigned.

The front end of the stack of tabulating cards 16 is held in place in the container by the front end wall 12 which is formed with a vertical opening or space 22 coincident with its height. The forward wall 12 is spaced from the bottom wall 11 to provide a horizontal slot or opening 23 to receive the uppermost card of the stack 16, when it is removed therefrom and inserted at the bottom of the stack.

It will be further observed that it was necessary to shorten the height of the rear wall 13, on which is mounted the stack engaging means 17 including the hinge ears 19, to lower the hinge connection with the container cover 24 to provide a space 25 above the stack 16, to house the upwardly inclined fingers 21 within the container and also to receive the card clamp holder 26 mounted on the under surface of the top member 27 of the cover 24, and the extra or such other cards as the reader may desire to be carried by said clamp, when the cover is in closed position.

Figure 4:
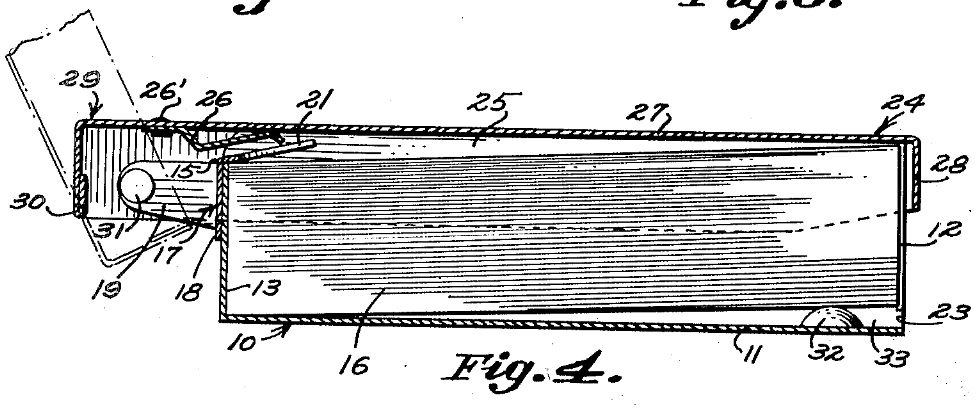
Fig. 4 is a longitudinal section with the cover closed.

The top member or element 27 is formed with an integral surrounding depending flange 28 adapted to embrace the front and side walls of the container to exclude the elements from the interior of the container. The top member 27 and the flange 28 extend rearwardly beyond the rear wall 13 to provide a handle portion 29, and the flange portion at its free edge is bent upon itself or has a strip 30 welded or otherwise secured thereto, so that the handle 29 can be more firmly gripped and the container more comfortably carried. It will be observed that the sides and front end wall are of uniform height and the cover top member 27, in closed position rests on said side and front walls in parallelism with the bottom wall 11. The cover 24 is mounted on the container 10 by rivets 31 extending through the hinge ear members 19 and the cover flange 28 (Figs. 1 and 4). The resilient clamp member 26 is of a width not greater than the space between the fingers 21 and is secured by rivets 26'. The end edge of the hand grip portion 30 of the handle 29 is adapted to engage the lower edges of the hinge ears 19 to limit the rearward opening movement of the cover 24 and to maintain said cover in a partially elevated position, so that the desired cards may be readily placed in the clamp member 26 while the container is being held without interference by the partially opened cover during the recording of the meter reading on the uppermost card.

It will be understood that the stack of cards 16 is always maintained at the normal capacity level of the containers so that should there be given a short meter route, the reader may add a sufficient number of extra cards at the bottom of the stack to build it up to its normal height in the container so that the rear end of the stack will always be in compressed engagement with the lip 20.

The bottom 11 of the container 10 spaced from the front end 12 is formed with integral upstanding bosses 32 to elevate the front end of the stack 16 and provide the space 33 to receive the meter reader's fingers in alignment with the spacer in gripping the end of the stack as an entity to easily lift and remove the stack from the container, and through the cooperation of the guard fingers 21 with the rear end of the stack, said stack is easily replaced in the container with the rear end of the stack compressed and so maintained beneath the lip portion 20 of the stack engaging means 17 carried by the rear end wall 13 of the container, and also the arrangement and location of the hinge ears of said means and hinge connection with flange 28 of the cover 24, is such, that the cover will be maintained closed when the container is being carried by the handle 29.

It will be apparent that I have provided a lightweight, sturdy, compact container for carrying a stack of meter reading cards, including a front wall spaced from the container bottom to form a horizontal space or slot 23, said front wall is formed with a vertical space or opening 22 coextensive with its height and intersecting said slot, the bottom of the container is formed with upstanding integral bosses 32 to elevate the forward end of the stack of cards and forming beneath the stack a space 33 intersecting said slot, said spaces and slot jointly contributing to render gripping of the forward end of the stack as an entity to readily remove the stack from and restore it to the container, an integral substantially skeletonized container cover hinging and stack engaging means 17 operatively associated with the rear end wall, said means including an end attaching body member having parallel rearwardly extending integral ears for hinged connection with the container cover, said body having integral laterally spaced guard fingers projecting forwardly and upwardly within the container and an integral lip portion intermediate the fingers, adapted to engage the upper end of the stack for directing it into compressing engagement with said lip as the stack is placed in the container, said container and associated parts being simple in construction, manufacturable at a minimum of cost, and efficient for purposes intended.

Although in practice I have found that the form of my invention illustrated in the accompanying drawings and referred to in the above description as the preferred embodiment, is the most efficient and practical; yet realizing that conditions concurrent with the adoption of my invention will necessarily vary, I desire to emphasize that various minor changes in details of construction, proportion and arrangement of parts may be resorted to within the scope of the appended claims without departing from or sacrificing any of the principles of this invention.

Having thus described my invention, what I desire protected by Letters Patent is as set forth in the following claims:

1. A container adapted to receive a stack of meter reading cards, including a bottom wall, and side walls integral with the bottom wall, a forward end wall, said forward end wall being formed with a vertical opening coextensive with the height of the side walls to permit gripping one end of the stack as an entity, said forward wall being spaced from the bottom wall to form a horizontally extending slot to receive a card removed from said stack, said container including a rear end wall, of less height than the front wall, stack-engaging means operatively associated with the rear end wall, said means including laterally spaced guard fingers and an intermediate element extending between the fingers and adapted to engage the upper end of the stack, said stack engaging means embodying parallel rearwardly extending hinge ears, a cover element, said cover element including a top member, a surrounding depending flange integral with the top member, said flange being hingedly connected to the said ears and adapted to embrace the front and side walls and extending beyond the rear end wall to provide a handle element.

2. The structure as claimed in claim 1, wherein the member connecting the guard fingers defines a lip member compressingly engaging the upper end of the stack.

3. The structure as claimed in claim 2, wherein the lip member is a portion of an end plate mounted adjacent to the said end of the stack and the hinge ears are parallel arms integral with the end plate and extending rearwardly thereof and pivot means interconnecting the arms and the cover for hingedly mounting the cover for movement in a vertical plane.

4. The structure as claimed in claim 3, wherein the end plate is mounted on the rear end wall below the upper edges of the side walls, the stack engaging lip portion and the integral guard fingers extending upwardly and forwardly therefrom with their upper ends terminating within the container, and pivot means hingedly connecting the flange portion of said cover and arms, so that the movement in opening direction of the cover is limited by the engagement of the end flange portion with said arms.

5. The structure as claimed in claim 1, wherein the bottom of the container is formed with upstanding elements on opposite sides of the vertical opening in the forward end wall and spaced from said end wall to positively support the forward end of the stack above the bottom wall to provide a space intersecting the horizontal slot below the forward end wall, so that a finger may be inserted beneath the stack and between the upstanding elements to grip the forward end of the stack as an entity for lifting the stack out of the container.

References Cited in the file of this patent

UNITED STATES PATENTS

| | | |
|---|---|---|
| 2,538,084 | Collins | Jan. 16, 1951 |
| 2,653,038 | Dyer | Sept. 22, 1953 |
| 2,707,115 | Rolleston | Apr. 26, 1955 |